2,884,384
REGENERATING ION EXCHANGE PARTICLES

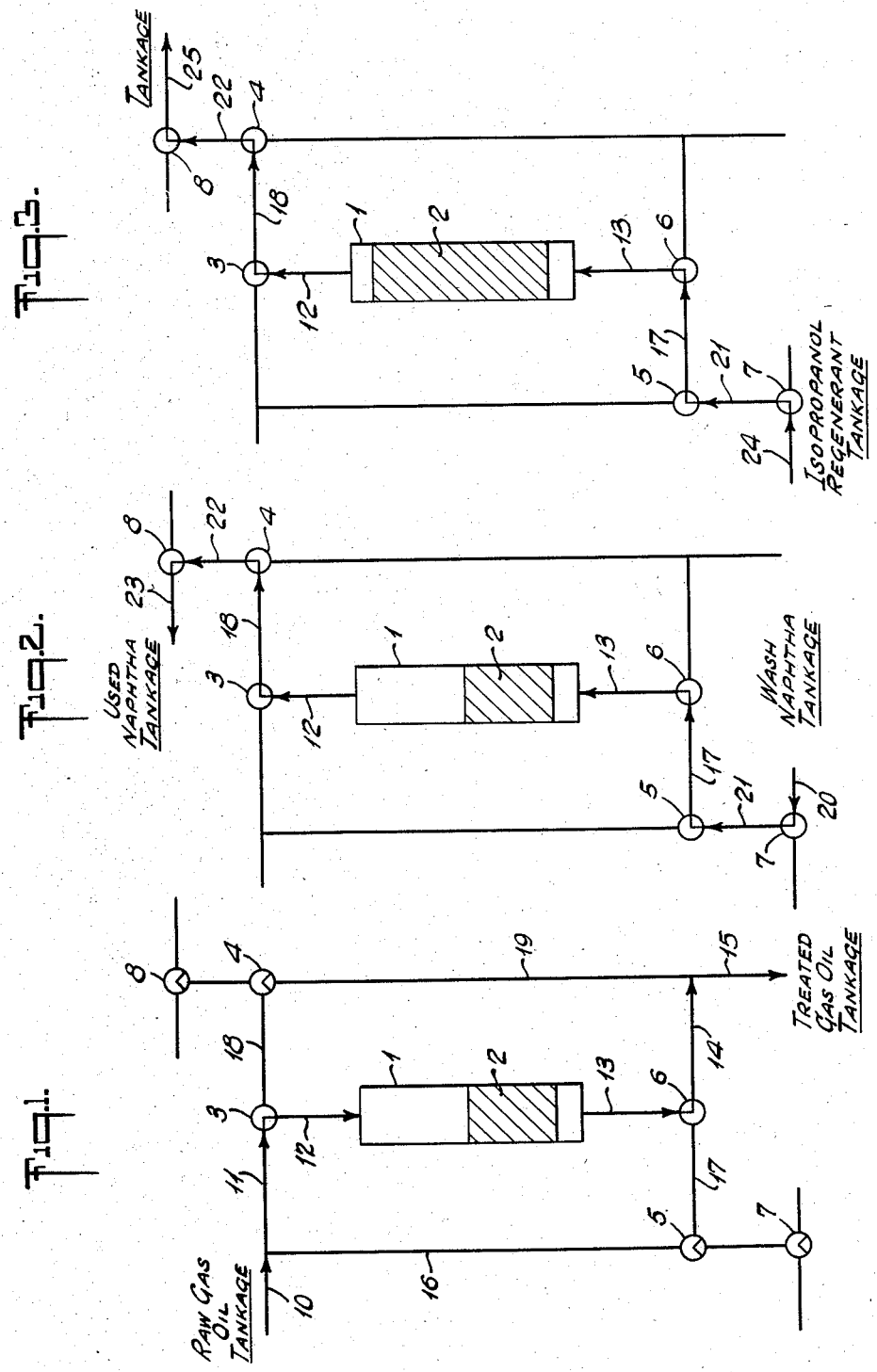

Robert Haygood Howell, Jr., Port Arthur, and Robert Alan Woodle, Groves, Tex., assignors to The Texas Company, New York, N.Y., a corporation of Delaware Application December 28, 1954, Serial No. 478,086

3 Claims. (Cl. 260—2.1)

This invention relates broadly to novel ion exchange phenomena, and more particularly to an improved process for regenerating ion exchange particles with little or no consumption of regenerant material. Since, at the present time, the most widely available ion exchange materials for a variety of technical applications are resin particles, i.e. organic polymers having negligible solubility in water or many organic solvents, this application primarily will be addressed to regeneration of such resin particles, but by no means is it intended to exclude other types of ion exchange particles from the application process.

The conventional cycle in an ion exchange process involves two principal phases, namely: an exhausting phase wherein reactive material borne in a liquid medium as a true or colloidal solution is chemically attracted to and combined with the ion exchange particles until their effective chemical capacity is spent; and a regenerating phase wherein the chemical activity of the spent particles is restored by treating them with a regenerant solution containing ions having sufficiently strong affinity towards the resin to replace and release those of chemically bonded reactive material. Such process necessarily consumes ionic regenerant and is thought to proceed according to the equation below wherein the illustrative reactive material to be exhausted is, for example, an organic acid, and caustic soda is the regenerant.

(Exhaustion phase)

(1) 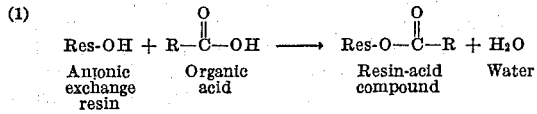

Anionic exchange resin    Organic acid    Resin-acid compound    Water (Regenerating phase)

(2) 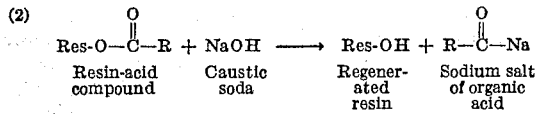

Resin-acid compound    Caustic soda    Regenerated resin    Sodium salt of organic acid The cycle concerned in our ion exchange process is different than the conventional one in that the regenerant does not appear to be altered chemically. For convenience herein we shall call this cycle a non-consuming cycle. In the processing phase of this type of cycle, after chemical attraction of reactive material from a nonpolar medium has occurred to the extent that the chemical capacity of the ion exchange particles is spent or substantially spent, continued feed of the nonpolar medium containing the reactive material results in further exhausting thereof for an extended period of time. The following theories have been advanced to explain this phenomenon of continued exhausting activity after the chemical capacity of the ion exchange particles has been spent: (a) hydrogen bonding occurs between the additionally-fed reactive material and the substance formed by the chemical union of the ion exchange particles with the previously-fed reactive material, perhaps according to the equation (wherein the reactive material being taken up is, illustratively, an organic acid):

(3) 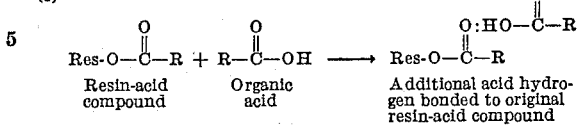

Resin-acid compound    Organic acid    Additional acid hydrogen bonded to original resin-acid compound (b) that the substance formed by the chemical union of the reactive material and the ion exchange particle acts as a solid or fixed solvent or an adsorbent for the additionally-fed reactive material, a purely physical phenomenon.

Regeneration of the ion exchange particles used in such non-consuming cycle is done by contacting them with a polar organic substance which, presumably, destroys the hydrogen bonding or, alternatively, acts as a solvent extractant of the reactive material to separate it from the fixed solution, thereby leaving the substance formed by the chemical union of the exchange particles and the originally-fed reactive material ready for another exhaustion phase. The ion exchange particles after such regeneration may be in part chemically receptive as well as "physically" receptive to additionally fed reactive material. The aforementioned theories are not intended to restrict the process of this invention, but rather they are intended to make the mechanism of the non-consuming cycle clearer.

Distinction between polar and nonpolar unions in compounds is believed to be one of degree, and in recent years compounds have been characterized broadly as being ionic, polar, and nonpolar. For the purpose of more clearly delineating this invention we will define a polar organic material for purposes of this invention as one having dielectric constant, $e$, at 20° C. (the ratio of the capacity of the electric condenser, the plates of which are separated by the medium of the material in question, to the capacity of the condenser at the same potential when the plates are separated by a vacuum) above 6, and a nonpolar material as one having such dielectric constant, $e$, below 6. Such dielectric constants of various common organic liquids are listed on page 47 of the text "The Characterization of Organic Compounds," Samuel McElvain (The Macmillan Company, New York, 1945); this text also discusses, at pages 44 and 54, useful theory and characteristics of pronouncedly polar and nonpolar organic materials.

A polar regenerant for the purpose of operating the process of this invention is an organic material having dielectric constant above 6 and capable of releasing at least a fraction of the reactive substance which has been attracted to and held by the exchange particles during the exhaust phase of the non-consuming cycle. Such polar regenerants ordinarily will be liquid at operating temperature and pressure, but, in the practice of our process, it is conceivable to have at least a fraction of the regenerant a gas or a solid dissolved in a suitable liquid solvent.

Ordinarily, for efficiency and economy in the practice of our process, the ion exchange particles are assembled as a bed for contact with the nonpolar medium to be exhausted. Other methods of contact, e.g. slurrying the ion exchange particles in the nonpolar medium, can also be used. Mixed beds of ion exchange particles having different characteristics such as beds having both a cation exchange and an anion exchange section are thought to be usable when reactive substances to be exhausted from the media differ from each other as to affinity for a particular resin. Ordinarily, however, the bed will be assembled of the same kind of ion exchange particles.

Suitable nonpolar media for exhaustion of contained reactive organic materials are believed to include, for example: hydrocarbon oils such as gas oils, lube stocks, crudes and the like, lighter paraffins, naphthenic hydrocarbons and aromatics; halogenated hydrocarbons; ethers; nitroparaffins; and alcohols, ketones, and esters of molecular weight above about 150.

Polar regenerant for the regenerating phase of the non-consuming cycle may be, for example, lower alkanols such as methanol, ethanol, and isopropanol; acetone; alkyl amines such as butylamine; lower chloroaliphatic acids such as dichloroacetic acid; glycerol; or suitable mixtures of these materials.

Organic materials amenable to this type of exhaustion from nonpolar media are ordinarily dissolved solutes therein but may be even colloidal particles. Typical reactive organic substances removable in the exhaustion phase of the non-consuming ion exchange cycle are believed to include, for example, organic acids such as naphthenic acids and sulfonic acids, acids such as phenol, methyl nitrite, mercaptans and like materials which are titratable with strong ionic bases, acid salts such as phenyl ammonium acid succinate, organic bases such as quaternary ammonium compounds, bases such as amines and hydrated amines, reaction products of organic acids with organic bases, and their mixtures.

A major problem affecting the use of ion exchange particles in the non-consuming ion exchange cycle is osmotic shock resulting in strains within the ion exchange particles themselves (which can be large enough to cause friation of the particles during cyclic operation). Another problem is the crushing of the ion exchange particles by each other, particularly in the regeneration phase of the cycle. The strains and crushing tendencies are believed to be set up in the particles when they expand during contact with polar regenerant.

Generally the price of suitable ion exchange resins is high, e.g. $40–60 per cubic foot. The size of the particles having good flow characteristics through a bed is ordinarily between about 20 and about 50 mesh with no more than a slight proportion being finer than about 70 mesh (U.S. Standard Screen Scale). Friation of the particles results in creation of resin fines with excessive pressure drop in the bed, and such fines wash away easily. This represents resin loss, power loss, and additional separating operations. Losses from a resin bed as high as 3.1 volume percent per exchange cycle have been experienced when using isopropanol regenerant after exhausting gas oil of organic acids. Such losses render the treatment prohibitively expensive.

Specifically, our invention is an improvement for reducing ion exchange particle friation in a process for cyclically regenerating ion exchange particles with polar organic regenerant after use of said particles for exhausting nonpolar media of reactive organic substances contained therein, i.e. the non-consuming cycle. The improvement comprises contacting said particles with polar organic regenerant in the presence of nonpolar liquid having viscosity not substantially about 1.0 centipoise at 70° F.

A particularly effective method for use in our process is to flood a bed of ion exchange particles with the low viscosity nonpolar liquid, and then to introduce the polar regenerant upflow into the flooded bed at rate sufficiently high to establish and maintain dispersion of the bed particles as the necessary quantity of polar regenerant is being introduced. The bed settles after the introduction of the polar regenerant. The liquid mixture is allowed to stand in contact with the particles for a short period of time, 1–30 minutes, then drained off. In addition to decreasing osmotic shock, this method gives the particles substantial "elbow room" for their expansion to eliminate the possibility of their crushing each other.

The desired bed dispersion in preferred operation appears to be a rapid lifting of the bed upon admission of the regenerant flow, followed by a free random settling of the individual particles. To achieve this type of dispersion in our resin beds the rate of introduction of polar regenerant should be generally in excess of one gallon per minute per square foot of bed cross-sectional area. For comparatively low density resin particles in the preferred size range as are presently marketed, e.g. 20 to 40 pounds per cubic foot and sizes between about 20 and about 50 mesh, the flow of polar regenerant used is about 1.2–1.5 g.p.m./square foot of bed cross-sectional area; and for higher density particles in the preferred size range, e.g. 40 to 50 pounds per cubic foot and sized between about 20 and about 50 mesh, the flow of polar regenerant used is about 1.5–2.0 g.p.m./square foot of bed cross-sectional area. Other types of bed dispersion suitable for our regenerating operation can involve dense phase fluidizing of the individual particles or otherwise imparting to them random and roiling motion.

We have found that regeneration proceeds smoothly and rapidly rather than slowly and erratically when viscosity of the nonpolar liquid mixed with polar regenerants in our process is comparatively low, i.e. not substantially above one centipoise at 70° F., preferably about 0.6 centipoise at 70° F. When the nonpolar medium has comparatively high viscosity such as does a heavy hydrocarbon oil, we use a lower alkane of suitably, 4–8 carbon atoms and preferably butane to flush and flood the bed.

After regeneration has been accomplished, the particles can be washed substantially free of polar regenerant with a flow of nonpolar material and so prepared for the next cycle. By using bed diameter of at least a foot, and preferably larger in commercial installations, crushing of the particles by each other during regeneration is less likely than when the bed is confined by a reactor of smaller diameter. For efficient operation the settled bed depth should be at least two feet.

Our invention is particularly applicable for exhausting hydrocarbon oils of organic acids such as naphthenic acids. The preferred temperature of such hydrocarbon in the exhaust phase is about 130° F., but higher or lower temperatures can be used if desired. Typical conditions in such exhausting phase are: space rate of about 1–3 volumes of charge oil per volume of resin per hour and throughput amounting to about 10–12 volumes of charge oil per volume of resin.

Highly porous ion exchange resins are the preferred kind of ion exchange particles for use in our process. Thus, we have found that the porous, synthetic, low cross linked, quaternary ammonium type anion exchange resin Amberlite XE–75, the trade name for a strong base ion exchange resin, appears from our experience to be the most suitable and thus preferred type for removing naphthenic acids from hydrocarbon oil. We have found that other operable anion exchange resins for this service are, for example, Amberlite XE–98 (the trade name for a basic ion exchange resin) and Amberlite XE–76 (the trade name for a weak base ion exchange resin). Particularly porous ion exchange resins suitable for use in the invention process are described in U.S. Patent 2,597,440 of May 20, 1952.

As received from the manufacturer anionic exchange resins are ordinarily in hydrochloride salt form and contain as much as 40% water by weight. They should be chemically regenerated before use in the non-consuming cycle, e.g. by washing with about 10 volumes of 10% caustic soda solution per volume of resin and then rinsing with water until all free caustic is removed. The resulting water-wet volume is the basis for all volumetric ratios discussed herein. During the initial chemical bonding operation preparatory to a series of non-consuming cycles water is removed from the resin and it shrinks appreciably, then gradually expands to slightly less than the water-wet volume.

Ordinarily, in the regeneration of the ion exchange resin after it has been used to exhaust a nonpolar medium of organic substances, consideration must be given to the ease of separating and recovering polar regenerant from the removed organic substance. We have found that 99% or purer isopropanol appears to be the most effective for naphthenic acids removal from an ion exchange resin. It is readily recoverable, e.g. by fractional distillation, from the rinsing naphtha or butane and also from the separated acids for recovery thereof.

The drawing is a schematic diagram showing preferred operation of our process. Figure 1 shows the exhaust phase of the non-consuming cycle wherein naphthenic acids are removed from raw gas oil. Figure 2 depicts rinsing of the ion exchange bed with naphtha of low viscosity. Figure 3 depicts regeneration of the bed with isopropanol regenerant. Vessel 1 is of columnar construction and contains ion exchange resin particles. Two-way switch valves 3, 4, 5, 6, 7, and 8 selectively direct the flow of liquids necessary in the different phases of the operating cycle. Pumps, blow cases, and auxiliary lines are not shown but are, of course, supplied where necessary or desirable. Bed diameter is about 7 feet and settled bed volume about 100 cubic feet.

The exhaust phase is operated as follows: raw gas oil containing naphthenic acids is admitted through inlet 10 at the rate of 54 barrels per hour (3 volumes of gas oil per volume of ion exchange bed per hour) to the bed of ion exchange resin-naphthenic acid compound, 2, which resulted from a previous chemical bonding operation; the gas oil passes into line 11 through valve 3, into vessel 1 through line 12, out vessel 1 through line 13, thence through valve 6 and line 14 and outlet 15 as a treated product. This phase of the cycle is carried on for about 3⅓ hours for a throughput of 180 barrels (10 volumes of gas oil per 100 cubic feet of resin bed). At the end of the exhaust phase gas oil is drained as completely as possible from the bed in vessel 1 preparatory to regeneration.

The regeneration phase of this cycle commences by introducing low viscosity naphtha in line 20, through valve 7, into line 21, through valve 5, into line 17, through valve 6, into vessel 1 through line 13, out vessel 1 through line 12, through valve 3 into line 18, through valve 4 into line 22, through valve 8, and into a naphtha receiver by means of line 23. About 53½ barrels of naphtha are used in this operation. The naphtha flow is about 100 barrels per hour. At the end of the wash period naphtha in vessel 1 is allowed to drain into tankage so that the level of naphtha in vessel 1 just covers the settled resin bed.

Isopropanol regenerant, 18 barrels, is then injected in a period of about 10 minutes into line 24, through control valve 7, up line 21, through valve 5, into line 17, through valve 6, into line 13, and upflow in vessel 1. Displaced liquid flows out line 12, through valve 3, into line 18, through valve 4, into line 22, through valve 8, and out line 25 into tankage. This rate of introduction is sufficient to cause dispersion of the resin bed by lifting it up momentarily to about twice its settled height. Then the bed settles freely so as to prevent particle crushing. Simultaneously, the displacement of naphtha by isopropanol in the 10-minute period eliminates osmotic shock to the resin particles. The resulting isopropanol-naphtha mixture is allowed to stand in the bed for 10 minutes, then drained into tankage preparatory to the exhaust phase of the next cycle. 43 barrels of naphtha are admitted downflow through line 23, through valve 8, into line 22, through valve 4, into line 18, through valve 3, into vessel 1 by line 12, out line 13, through valve 6, into line 17, through valve 5, into line 21, through valve 7 and into tankage by means of line 20. Then the entire cycle is repeated.

Naphthenic acid-bearing isopropanol can be stripped of naphtha and further fractionated by distillation to yield isopropanol and naphtha for reuse and a product of mixed naphthenic acids.

The efficiency of the isopropanol regenerant drops when it is diluted with water, e.g. if 91% isopropanol is used instead of 99% isopropanol, only about half as much organic acid removal is possible and greater expansion of the resin occurs. We have found methanol to be substantially comparable to isopropanol for regenerating resins used in exhausting hydrocarbons of naphthenic acids, but methanol induces more swelling of the resin and so increases the danger of resin friation. Maximum expansion of the resin particles occurs when they become fully wetted with the polar regenerant. Regeneration can be done at ordinary temperatures and should not exceed such temperature as will damage the resin, e.g. about 160° F. in the case of XE–75. For efficiency and economy in the practice of our process regeneration is operated between about 60° and about 100° F. Pressure used should be sufficient to maintain the regenerant mixture liquid. We have found that at least about 1–1.5 volumes of isopropanol per settled volume of resin bed (18–27 barrels per 100 cubic feet of settled resin bed) is needed to achieve the most efficient regeneration.

The following example shows one way in which our invention has been practiced, but is not to be construed as limiting the invention.

*Example.*—In a run of 44 successive cycles naphthenic acids were separated from gas oil stocks by the following procedure: exhausting the acids from the gas oil by means of a bed ox XE–75 ion exchange resin, previously described, said bed having been used previously for chemical bonding of the acids; washing the resin bed with naphtha (mixed hexanes) to leave the bed flooded with the naphtha; and regenerating with isopropanol admitted upflow into the flooded bed at rate sufficient to cause lifting and dispersion thereof. At the end of the run the resin appeared to be in good condition and there was no visible evidence of resin attrition upon critical visual inspection. Actual resin losses attributable to resin friation from the above run were less than 0.05 volume percent per cycle, based on volume of resin initially charged. Detailed description of an intermediate cycle in the run is described below.

The settled height of the bed at the start of the cycle was about 25.5 inches in a 47 mm. I.D. glass column. Fourteen liters of gas oil containing naphthenic acids were passed upflow through the resin bed and withdrawn at the rate of 715 ml./hr. Analysis of the gas oil fed was:

| | |
|---|---|
| Gravity, ° API | 26.1 |
| Color (½ inch Lovibond) | 10 |
| Viscosity, centistokes, at 100° F. | 5.78 |
| Neut. No., mg. KOH/gram | 0.41 |
| Sap. No. | 0.77 |
| A.S.T.M. distillation, ° F.: | |
|    Initial boiling point | 464 |
|    50% over | 554 |
|    End point | 690 |

Neut. No. of the gas oil effluent drawn off the ion exchange bed was between 0.03 and 0.04 averaging about 0.03, and indicating removal of about 92.7% of the acids initially in the gas oil stock. The bed was drained of gas oil, backfilled with 500 ml. of the naphtha, rinsed downflow with 2500 ml. of the additional naphtha, and left flooded with the naphtha. 2500 ml. of 99% isopropanol was admitted upflow into the flooded bed and the alcoholic effluent was withdrawn thereabove at the rate of about 200 ml. per minute, thereby causing lifting and dispersion of the bed. The alcohol-wetted maximum settled height of the bed was about 31 inches. The alcohol-wetted bed was then drained, further washed with an additional 1000 ml. of isopropanol, drained, and the isopropanol washing combined with the alcohol effluent. The bed was then rinsed downflow with 3000 ml. of the naphtha in preparation for the next cycle. The bulk of the low boiling materials were stripped by distillation from the naphthenic acid-bearing alcoholic effluent, the stripped residue composited with those of several other similar cycles, and the composited material subjected to distillation at 50 millimeters Hg pressure to yield mixed naphthenic acids having acid value of 176.

Obviously many modifications and variations of the invention, as hereinbefore set forth, may be made without departing from the spirit and scope thereof and, therefore, only such limitations should be imposed as are indicated in the appended claims.

We claim:

1. In a process for regenerating a bed of porous synthetic ion exchange particles with a liquid phase polar regenerant without chemical alteration of the regenerant after use of said particles for exhausting a hydrocarbon oil of an acidically-reacting organic substance contained therein, said ion exchange particles being susceptible to substantial swelling and attendant friation when contacted with the polar regenerant after contact with said hydrocarbon oil, the improvement for reducing friation of said ion exchange particles which comprises: draining the bed of the hydrocarbon oil; flooding the bed with a nonpolar liquid having viscosity not above about 1.0 centipoise at 70° F., said nonpolar liquid being a lower alkane of 4–8 carbon atoms; then introducing upflow into the flooded bed at least one volume of said polar regenerant per volume of bed at a rate in excess of one gallon per minute per square foot of bed cross-sectional area and sufficiently high for imparting free random motion to the individual ion exchange particles of said bed.

2. The process of claim 1 wherein the acidically-reacting organic substance being exhausted from the hydrocarbon oil comprises naphthenic acids.

3. The process of claim 1 wherein the regeneration is conducted at a temperature between about 60° and about 100° F., and the polar regenerant used is isopropanol containing not more than about 9% of water by weight.

References Cited in the file of this patent

UNITED STATES PATENTS

| | | |
|---|---|---|
| 2,692,244 | Kunin et al. | Oct. 19, 1954 |
| 2,722,236 | Coonradt et al. | Nov. 27, 1956 |

OTHER REFERENCES

Bodamer and Kunin: "Behavior of Ion Exchange Resins in Solvents Other Than Water," Ind. and Eng. Chem., 45, 25, 77–80 (1953).